US010379215B1

(12) United States Patent
Roovers (10) Patent No.: US 10,379,215 B1
(45) Date of Patent: Aug. 13, 2019

(54) LOCALIZATION OF WIRELESS NODES

(71) Applicant: NXP B.V., Eindhoven (NL)

(72) Inventor: Raf Lodewijk Jan Roovers, Eindhoven (NL)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 16/120,245

(22) Filed: Sep. 1, 2018

(51) Int. Cl.
    *G01S 13/76* (2006.01)

(52) U.S. Cl.
    CPC .................. *G01S 13/767* (2013.01)

(58) Field of Classification Search
    CPC ........ G01S 13/767; G01S 11/02; G01S 19/39; G01S 1/02; G01S 5/00; G01S 5/0273; G01S 5/0278; G01S 5/14; G01S 7/021; G01S 7/2923; H04W 4/02; H04W 64/00; H04W 16/14; H04W 16/28; H04W 24/10; H04W 28/0221; H04W 4/20; H04W 4/33; H04W 52/0229; H04W 52/0245; H04W 52/0274; H04W 56/001; H04W 64/003; H04W 72/04; H04W 76/28; H04W 88/02; H04L 27/0006; H04L 27/2605; H04L 27/2607; H04L 27/2647; H04L 41/0233; H04L 45/24; H04L 5/0032; H04L 5/0048
    See application file for complete search history.

(56) References Cited

U.S. PATENT DOCUMENTS

| | | | | |
|---|---|---|---|---|
| 6,161,018 A | * | 12/2000 | Reed | G01S 5/0252 342/457 |
| 10,039,008 B2 | * | 7/2018 | Laneman | H04W 16/14 |
| 2008/0198072 A1 | * | 8/2008 | Elwell | G01C 21/206 342/450 |
| 2015/0148050 A1 | * | 5/2015 | Siomina | H04J 11/005 455/452.1 |
| 2015/0282112 A1 | * | 10/2015 | Bialer | G01S 1/02 455/456.1 |
| 2017/0331670 A1 | * | 11/2017 | Parkvall | H04W 52/0274 |
| 2018/0242101 A1 | * | 8/2018 | Lin | H04W 4/02 |
| 2018/0310272 A1 | * | 10/2018 | Younis | H04W 4/33 |
| 2018/0356494 A1 | * | 12/2018 | Win | G01S 7/021 |

OTHER PUBLICATIONS

Dolmans, "Accurate Ranging Platform," IMEC, 24th Wireless Community Workshop, Dec. 7, 2017; 23 pages.

(Continued)

*Primary Examiner* — Nathan S Taylor (57) ABSTRACT

A method for localizing a wireless node includes synchronizing a respective time reference of a plurality of wideband spectrum-sensing units and a master transceiver. A sensing location of each wideband spectrum-sensing unit is stored in a first memory. Each wideband spectrum-sensing unit stores in a second memory a plurality of time-limited samples of a transmission received from a slave transceiver. The time limit of the transmission is determined by the master transceiver, receiving the transmission. The samples from the second memory are correlated with a corresponding plurality of reconstructed samples stored in the first memory to form a respective power delay profile for each of the of the wideband spectrum-sensing units. A slave location of the slave transceiver is determined by applying a Time Difference Of Arrival method to the respective power delay profiles.

20 Claims, 7 Drawing Sheets

(56) References Cited

OTHER PUBLICATIONS

Jeon et al., "BLE Beacons for Internet of Things Applications: Survey, Challenges and Opportunities," DOI 10.1109/JIOT.2017.2788449, IEEE Internet of Things Journal, pp. 1-18; 18 pages.
Kostic et al., "Estimation of the Parameters of a Multipath Channel Using Set-Theoretic Deconvolution," IEEE Transactions on Communications, vol. 40, No. 6, Jun. 1992, pp. 1006-1011; 6 pages.
Lanzisera, "RF Ranging for Location Awareness," EECS-2009-69, Univ. of California at Berkeley, May 19, 2009; 103 pages.
Trueposition, "Pioneering Location Solutions for a Safer World"; 30 pages.

\* cited by examiner

LOCALIZATION OF WIRELESS NODES

FIELD

This disclosure relates generally to localization of wireless nodes, and more specifically to localization of wireless nodes with wideband spectrum sensing and correlation to historical channel data.

BACKGROUND

Accurate localization of a wireless transmitter with respect to an infrastructure is difficult to achieve by using traditional techniques. Localizing a wireless node can be achieved by triangulation techniques based on a Received Signal Strength Indication (RSSI), however the accuracy is limited by the transceiver bandwidth of the wireless transmitter. Furthermore, techniques based on RSSI, Time of Flight (ToF) or phase-based ranging techniques suffer from multipath and/or non Line of Sight (nLOS) constraints. Specifically, a transmission from the wireless transmitter to a wireless receiver can result in multiple copies of the same transmission arriving at the wireless receiver with undesirable constructive or destructive interference due to the various amplitudes and delays caused by multipath interference. Alternatively an nLOS constraint can result in a single delayed copy from the transmission being indirectly reflected by an intervening object.

Attempts to mitigate the aforementioned limitations have included the use of additional wireless receivers, repetitive measurements and combining techniques (e.g., RSSI and ToF). Performing repetitive measurements and using additional receivers with one or more localization techniques leads to additional power dissipation, and complexity. Furthermore, existing standards such as Bluetooth® Low Energy (BLE) have limited support for ranging techniques, and remain limited in accurately resolving the location of the wireless node due to bandwidth limitations.

BRIEF DESCRIPTION OF THE DRAWINGS

The present invention is illustrated by way of example and is not limited by the accompanying figures, in which like references indicate similar elements. Elements in the figures are illustrated for simplicity and clarity and have not necessarily been drawn to scale.

DETAILED DESCRIPTION

Embodiments of systems and methods described herein provide for determining an accurate location of a wireless node relative to an infrastructure. The location is determined with at least two wideband spectrum-sensing units that are synchronized in time and have defined locations on the infrastructure. The wideband spectrum-sensing units perform wideband measurements of a transmission from the wireless node through a channel to a wireless receiver, in an unobtrusive manner. The plurality of wideband measurements are further correlated with previously determined channel information and combined with a Time Difference Of Arrival (TDOA) method to determine the location of the wireless node. In addition, the localization method enables environmental mapping as well as the detection of potential spoofing attempts to access the wireless receiver.

In one example embodiment, a wireless node includes a key Frequency Operated Button (FOB) and the infrastructure is an automobile. By determining an accurate location of the key FOB, the key FOB can unlock specific doors on the automobile, or perform other location specific tasks. In another example, a phone location can be determined relative to the automobile. Determination of direct and indirect paths between the wireless transmitter and the wireless receiver enables mapping of the channel environment including the infrastructure, transmitter, receiver, and intervening objects, which contribute to multipath. In one embodiment, specific features of the channel environment are compared to previous determinations, or prerecorded scenarios, of the environment to detect the presence of an occupant in the automobile or an open door, for example. In another embodiment, the signal characteristics (e.g., strength and location), of the detected key FOB are used to detect spoofing attempts at gaining access to the wireless receiver with an intervening device.

Figure 1:
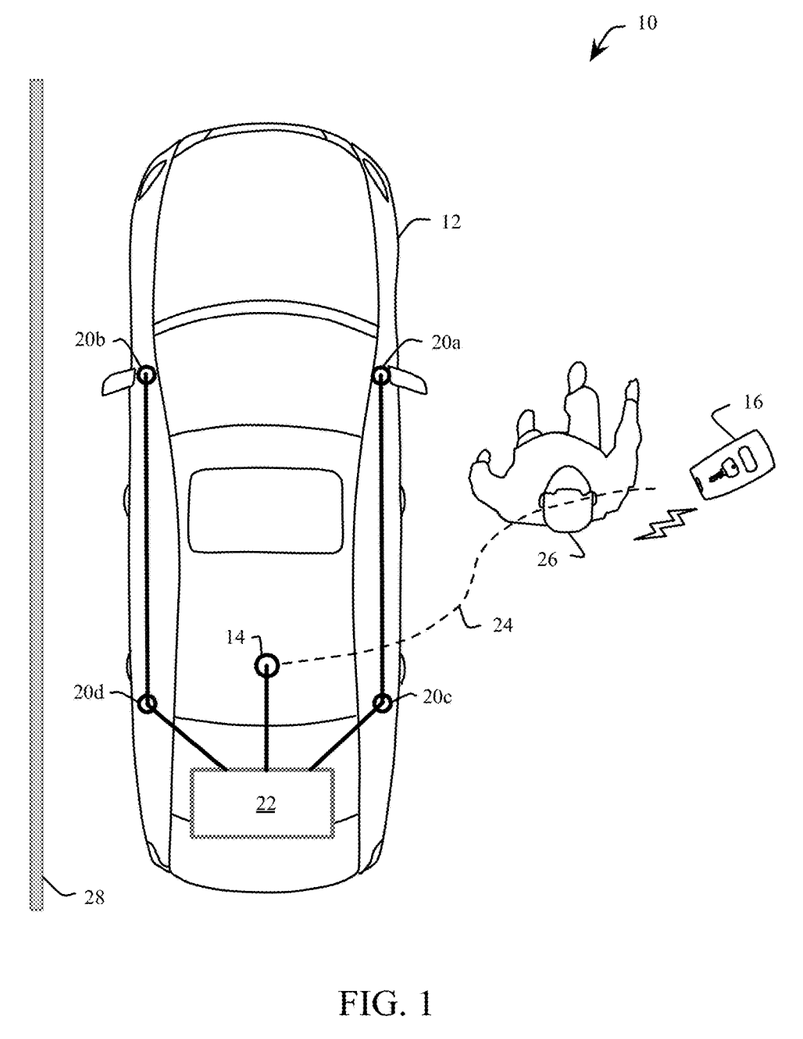
FIG. 1 is a plan view of a system for localizing a wireless node, in accordance with an embodiment of the present disclosure.

FIG. 1 shows a system 10 for localizing a wireless node, in accordance with an embodiment of the present disclosure. The system 10 includes an automobile 12, which is a physical infrastructure having a variety of electronically controllable functions, controlled by a master transceiver 14. For example, in one embodiment the master transceiver 14 controls the locking or unlocking or doors on the automobile 12. In another embodiment, the master transceiver 14 opens or closes windows on the automobile 12, or controls an entertainment center (e.g., a radio).

The master transceiver 14 communicates with (e.g., transceives), with a slave transceiver 16 using a wireless communication protocol for transmitting and receiving data. In one embodiment, the slave transceiver 16 is a key FOB operating with the BLE protocol. In other embodiments, the master transceiver 14 and the slave transceiver 16 transceive with a Personal Area Network (PAN) protocol, examples of which include but are not limited to the communication protocols based on the family of IEEE 802.15 standards, such as Bluetooth®, WiFi®, ANT®, Zigbee®, and low powered versions of communication protocols, such as BLE, and the like. System 10 includes four wideband spectrum-sensing units 20a, 20b, 20c and 20d, (generally 20), mounted on the automobile 12 with sufficient separation to minimize blocking of each of the transmission channels between each of the wideband spectrum-sensing units 20 and the slave transceiver 16 due to an intervening object. Various embodiments include different placements and quantities of the wideband spectrum-sensing units 20.

Each of the wideband spectrum-sensing units 20 and the master transceiver 14 are connected to a processor 22. In one embodiment, the connection between the processor 22 to each of the wideband spectrum-sensing units 20 and the master transceiver 14 is made over a high speed data bus, such as an automotive Ethernet bus, although other bus protocols are envisioned within the scope of this disclosure. In one embodiment, the processor 22 is a Digital Signal Processor capable of performing convolutions and correlations between data sets. In various embodiments, the processor 22 includes a system interface (not shown). In example embodiments, the system interface includes, but is not limited to, a bidirectional data port for transferring data to or from the processor 22, or a display and keypad interface.

The slave transceiver 16 communicates with the master transceiver 14 through a channel 24. In various embodiments, the channel 24 between the slave transceiver and the master transceiver 14 is blocked, for example by the presence of an intervening object such as a human 26. In other embodiments, the channel 24 includes a multitude of transmission paths (e.g., "multipath"), as a result of reflections from electrically reflective surfaces, such as a reflective wall 28. In another embodiment, the physical infrastructure is a building (e.g., a home or a shopping mall), with walls, furnishing and the like, each of which can contribute to the formation of multipath channels or blocking of the transmission.

The presence of both direct and multipath signals and the limited bandwidth of a Wireless PAN (WPAN) protocol based transceiver limits the ability to accurately locate the slave transceiver 16. Independent of the communication between the slave transceiver 16 and the master transceiver 14, the wideband spectrum-sensing units 20 also receive the transmission from the slave transceiver 16, sampled with a higher bandwidth than the bandwidth of the master transceiver 14. The transmission samples from the wideband spectrum-sensing units 20 are compared with previously determined channel data to form respective power delay profiles, and then TDOA methods are used to determine the slave location of the slave transceiver 16.

The sensing locations are stored in a first memory prior to executing the TDOA method. In one embodiment, the first memory (not shown) is connected to the processor 22. In one embodiment, the master transceiver 14 also informs each of the wideband spectrum-sensing units 20 as to the channel (e.g., for WPAN protocol), and the start and end time of the transmission received from the slave transceiver 16. A WPAN channel is defined by one of a plurality of sequential frequency ranges. In another embodiment, the master transceiver 14 only provides the start and end time to each of the wideband spectrum-sensing units 20, thereby simplifying the design of the master transceiver 14 and each of the wideband spectrum-sensing units 20 at the expense of processing, with the processor 22, additionally sampled data from more than one channel. Each of the wideband spectrum-sensing units 20 and the master transceiver 14 are also temporally synchronized to a time reference, (not shown).

Figure 2:
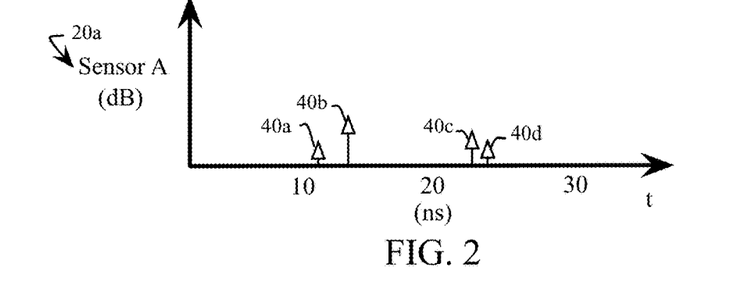
FIG. 2, FIG. 3, FIG. 4 and FIG. 5 are graphical views of the channel response measured by each of the four wideband spectrum-sensing units shown in FIG. 1.

Referring now to FIG. 2 to FIG. 5, with continued reference to FIG. 1, the measured channel response is shown for each of the wideband spectrum-sensing units 20 of FIG. 1. Specifically, FIG. 2 shows a plurality of received transmissions 40*a*, 40*b*, 40*c* and 40*d*, (generally 40), transmitted by the slave transceiver 16 and received by the wideband spectrum-sensing unit 20*a*. The different magnitudes and multipath time delays for each of the received transmissions 40 result from a combination of direct and indirect paths taken by each received transmission 40.

Figure 3:
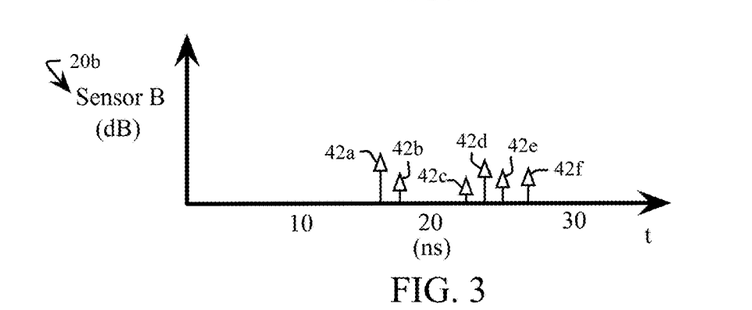

FIG. 3 shows a plurality of received transmissions 42*a*, 42*b*, 42*c*, 42*d*, 42*e* and 42*f*, (generally 42), transmitted by the slave transceiver 16 and received by the wideband spectrum-sensing unit 20*b*. The different magnitudes and multipath time delays for each of the received transmissions 40 result from a combination of direct and indirect paths taken by each received transmission 40.

Figure 4:
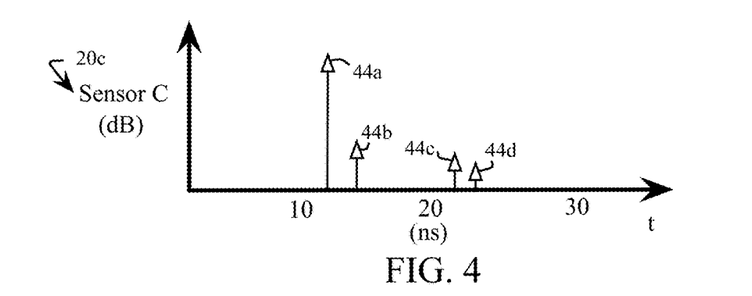

FIG. 4 shows a plurality of received transmissions 44*a*, 44*b*, 44*c*, and 44*d*, (generally 44), transmitted by the slave transceiver 16 and received by the wideband spectrum-sensing unit 20*c*. The different magnitudes and multipath time delays for each of the received transmissions 40 result from a combination of direct and indirect paths taken by each received transmission 40.

Figure 5:
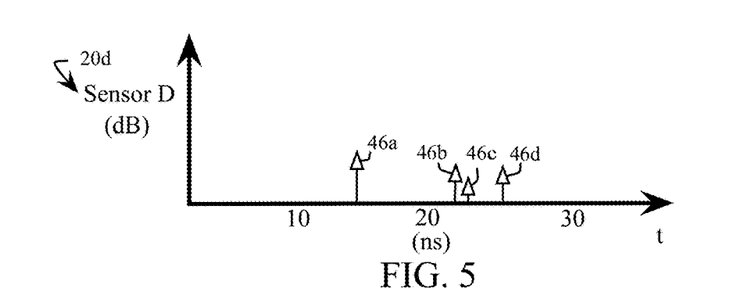

FIG. 5 shows a plurality of received transmissions 46*a*, 46*b*, 46*c* and 46*f*, (generally 46), transmitted by the slave transceiver 16 and received by the wideband spectrum-sensing unit 20*d*. The different magnitudes and multipath time delays for each of the received transmissions 40 result from a combination of direct and indirect paths taken by each received transmission 40.

Figure 6:
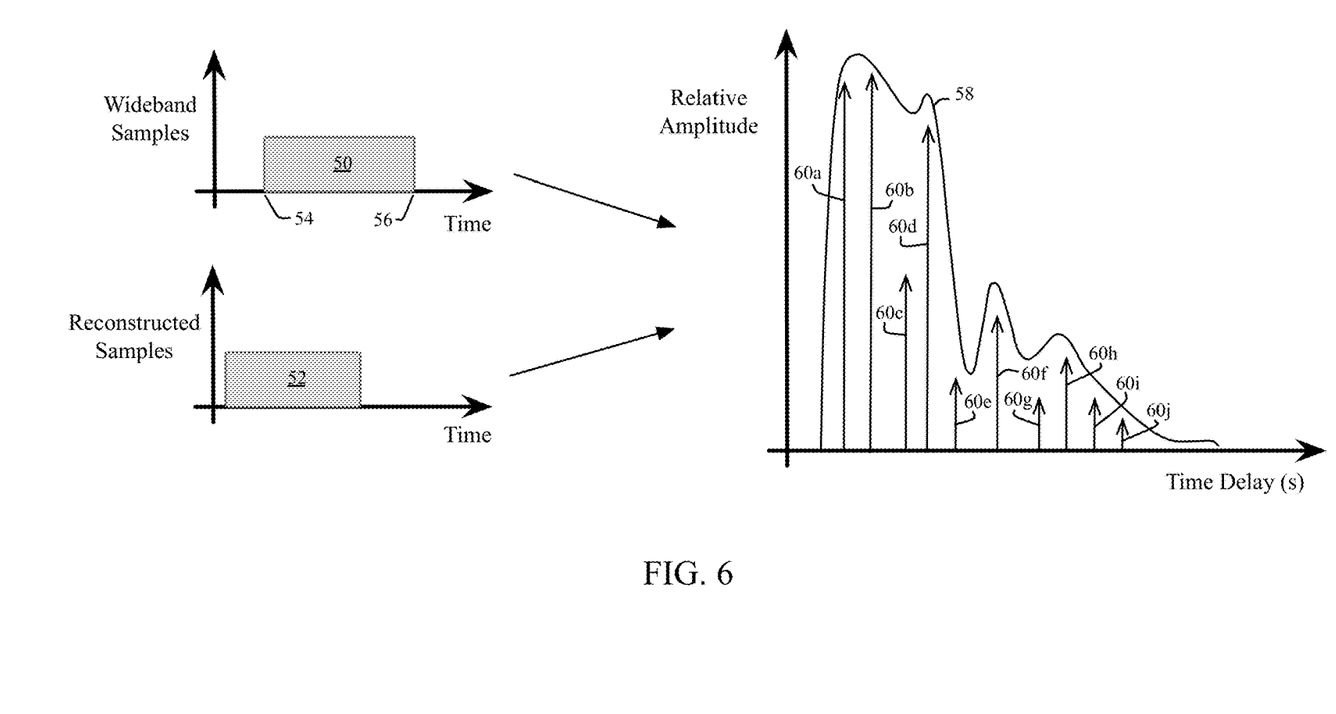
FIG. 6 is a flowchart representation of a method for generating a power delay profile for one of the wideband spectrum-sensing units shown in FIG. 1.

FIG. 6 shows a flowchart representation of a method for generating a power delay profile 58 for one of the wideband spectrum-sensing units 20 shown in FIG. 1. A plurality of samples 50, (corresponding to one of the group of samples 40, 42, 44 or 46 from FIG. 2 to FIG. 5), are stored in a second (buffer) memory by the respective wideband spectrum-sensing unit 20. The samples 50 are time limited by the wideband spectrum-sensing unit 20 with a start time 54 and a stop time 56 to reduce the second memory storage requirements and subsequent computation burden by the processor 22. In one embodiment, the start time 54 and stop time 56 correspond to the start and ending of a transmission from the slave transceiver 16 to the master transceiver 14, wherein the start time 54 and stop time 56 are subsequently transmitted to each of the wideband spectrum-sensing units 20 by the master transceiver 14. In various embodiments, the start time 54 and stop time 56 include additional time guard bands to ensure that the transmission is fully captured and sampled by each of the wideband spectrum-sensing units 20.

The samples 50 are retrieved from the second memory by the processor 22 and correlated to a plurality of reconstructed samples 52 to determine each of the transmissions 60*a*, 60*b*, 60*c*, 60*d*, 60*e*, 60*f*, 60*g*, 60*h*, 60*i* and 60*j*, (generally 60), thereby forming the power delay profile 58. Each transmission 60 corresponds to a unique path, (either a direct or multipath), between the slave transceiver 16 and the respective wideband spectrum-sensing unit 20. The reconstructed samples 52 are based on previous transmissions received by the wideband spectrum-sensing units 20, and retrieved from a first memory by the processor 22. In one embodiment, the first memory is connected to, or forms part of, the processor 22. In another embodiment, the previous samples are stored in the respective wideband spectrum-sensing unit 20. The reconstructed samples 52 have an adjusted time resolution to match the samples 50. In one embodiment the reconstructed samples 52 are formed prior to the completion of generating the samples 50 (e.g., prior to the stop time 56).

In one embodiment, the correlation of the samples 50 with the reconstructed samples 52 is performed with a convolution method. In other embodiments, the convolution method is replaced with a Maximum Likelihood method, a Matrix Pencil method or a Set-Theoretic Deconvolution method, to reduce the computational burden on the processor 22 for computing a direct path between the slave transceiver 16 and at least one of the wideband spectrum-sensing units 20*a*.

Figure 7:
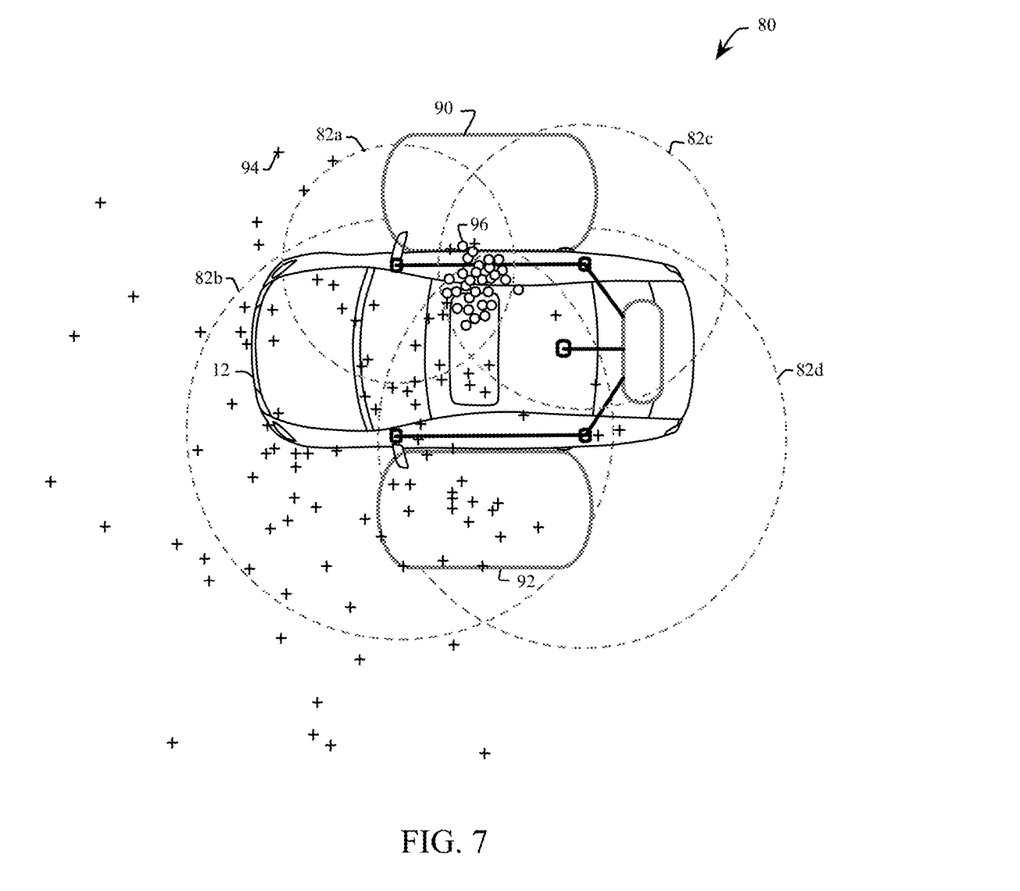
FIG. 7 is plan view of a vehicle showing a Time Difference of Arrival method using particle distribution to determine a location of a wireless node.

FIG. 7 shows a TDOA method 80 based on trilateration-based particle filtering for determining the slave location of the slave transceiver 16 relative to the automobile 12, from the respective first paths 60a of each of the plurality of power delay profiles 58. Other TDOA methods are considered to be within the scope of this disclosure and are not limited by the particle filtering approach. The method 80, includes a plurality of distance measurement rings 82a, 82b, 82c and 82d, (generally 82), corresponding to respective wideband spectrum-sensing units 20a, 20b, 20c and 20d. The automobile 12 include door zones 90 and 92. The various "+" markers 94 show an initial particle distribution, and the "o" markers 96 show converged particles. In the embodiment shown in FIG. 7, the converged particles 96, show that the slave transceiver 16 is proximate to the door zone 90.

Figure 8:
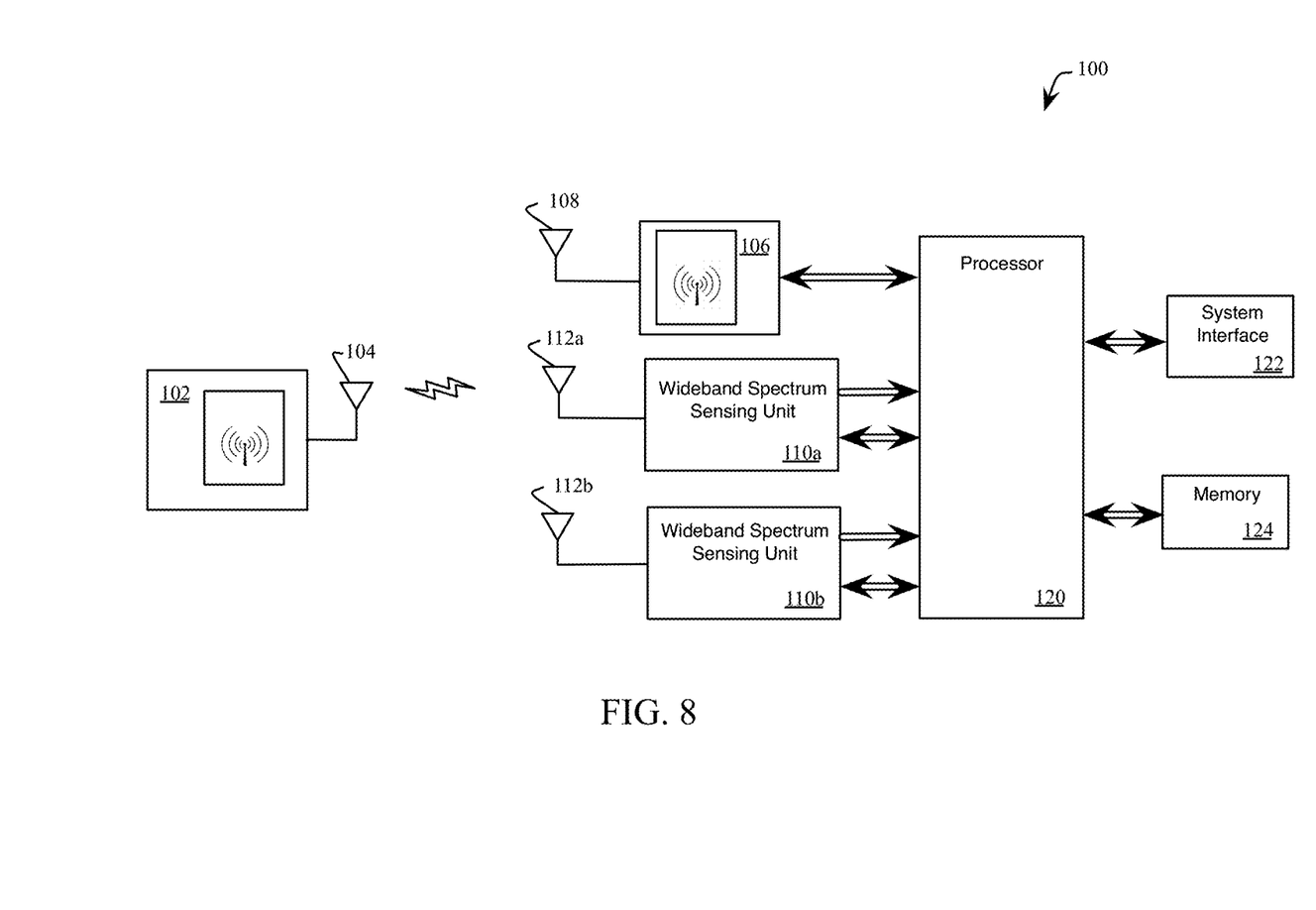
FIG. 8 is a functional block view of a system for localizing a wireless node, in accordance with an embodiment of the present disclosure.

FIG. 8 shows a system 100 for localizing a wireless node, in accordance with an embodiment of the present disclosure. A slave transceiver 102 transmits a transmission with an antenna 104. A master transceiver 106 receives the transmission with an antenna 108. A plurality of wideband spectrum-sensing units 110a and 110b, (generally 110), also receive the transmission with respective antennas 112a and 112b, (generally 112). The master transceiver 106 and each of the wideband spectrum-sensing units 110 have bidirectional communication with a processor 120. In various embodiments, the processor 120 a system interface 122 and a memory 124.

In one embodiment, the system interface 122 includes a bidirectional port for programming and receiving data from the processor 120. In another embodiment, the system interface 122 includes a display and keypad for modifying programs or settings of the processor 120. In one embodiment, the memory 124 is volatile or non-volatile RAM. In another embodiment, the memory 124 is integrated with the processor 120 having a single semiconductor. In one embodiment, the processor 120 is a Digital Signal Processor, however other processor architectures capable of performing convolutions are envisioned within the scope of this disclosure.

Figure 9:
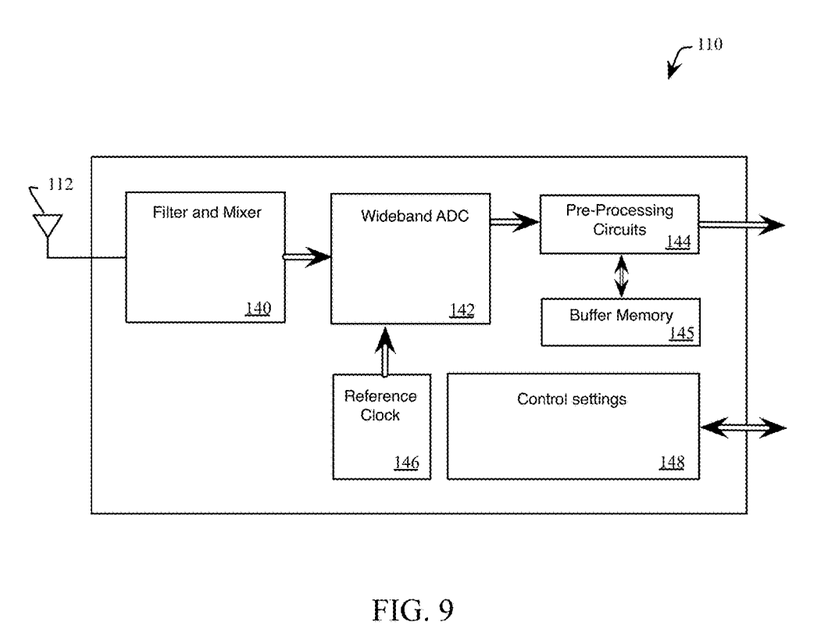
FIG. 9 is a functional block view of the wideband spectrum-sensing unit shown in FIG. 8, in accordance with an embodiment of the present disclosure.

Referring to FIG. 9, with continued reference to FIG. 8, each of the wideband spectrum-sensing units 110 are described in further detail. In one embodiment, each of the wideband spectrum-sensing units 110 includes a Filter and Mixer 140 receiving the transmission from the antenna 112. In an example embodiment, the Filter and Mixer 140 limits the bandwidth of the transmission to the Industrial, Scientific and Medical Radio (ISM) band and down coverts the received transmission. The output of the Filter and Mixer 140 is sampled by a wideband Analog to Digital Converter (ADC) 142 to provide a plurality of wideband samples. In another embodiment, the ADC 142 directly samples the transmission received at the antenna 112 to reduce the number of components of each of the wideband spectrum-sensing units 110 at the expense of requiring a more complex ADC 142. In an example embodiment, the wideband ADC 142 oversamples the ISM band to reduce filtering requirements. In various embodiments, the wideband ADC 142 includes a fixed gain Radio Front End (RFE) receiver to reduce delay variation. In other embodiments, the ADC 142 does not include an RFE receiver for simplifying the ADC 142 design at the expense of system accuracy. In the example embodiment, the wideband ADC 142 is a 14 bit Sigma-Delta converter sampling with at least 1 Giga-Samples/second.

The output samples of the wideband ADC 142 are received by pre-processing circuits 144. The pre-processing circuits 144 limit the samples received from the wideband ADC 142 by a channel number and acquisition window, prior to storing the limited sample data in a buffer memory 145 (e.g., a second memory). In an example embodiment, the buffer memory 145 is included with the pre-processing circuits 144. In another embodiment, the limited sample data are transferred to the processor 120 for storage in the first memory 124.

Each of the wideband spectrum-sensing unit 110 includes a reference clock 146 configured to be synchronized to each of the wideband spectrum-sensing units 110 and the master transceiver 106 with wired or wireless connections. In one embodiment, the control settings circuit 148 receives the channel number and acquisition window received from the master transceiver 106. In another embodiment, the control settings circuit 148 receives the channel number, the channel start time and the channel stop time. In an embodiment where the slave transceiver 102 and the master transceiver 106 communicate with the WPAN protocol, the channel number is defined by a frequency range of 2 MHz, being one of a series of consecutive channels defined by the WPAN protocol. The acquisition window is defined by the channel start and channel stop time as received by the master transceiver 106. In another embodiment, the control settings circuit 148 also receives the expected signal type (e.g., a BLE packet or continuous tone extension (CTE)), from the master transceiver 106 for use in determining the angle of arrival of the transmission from the slave transceiver 102. In another example embodiment, the control settings circuit 148 causes one or more of the circuits of the wideband spectrum-sensing unit 110 to exit a low power state upon detecting the channel start by the master transceiver 106, and returning to the low power state after the channel stop.

Figure 10:
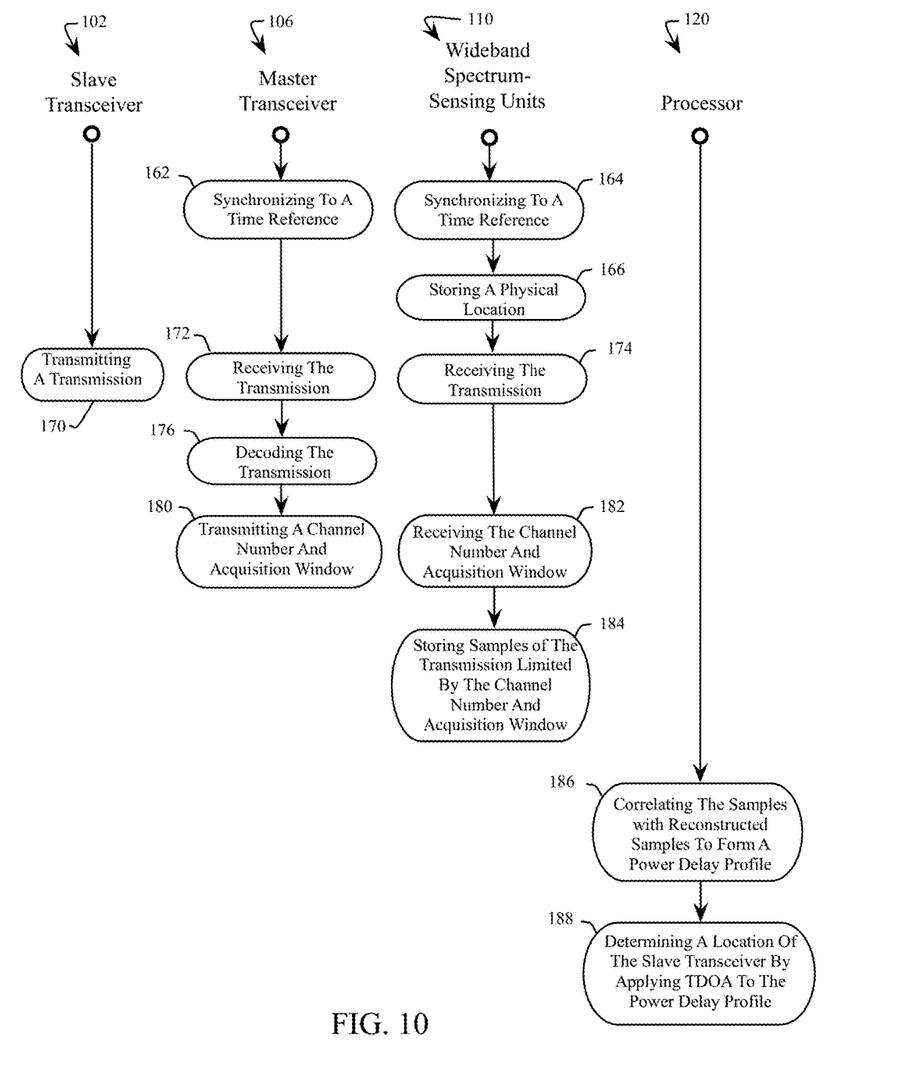
FIG. 10 is a flowchart representation of a method for localization of a wireless node, in accordance with an embodiment of the present disclosure.

FIG. 10, with continued reference to FIG. 8 and FIG. 9, shows a method for localization of a wireless node, in accordance with an embodiment of the present disclosure. At 162, the master transceiver 106 is synchronized to the time reference (e.g., reference clock) 146. At 164, each of the wideband spectrum-sensing units 110 is synchronized to the time reference 146. The wideband spectrum-sensing units 110 are synchronized to each other to perform the TDOA method, while the master transceiver 106 is synchronized to provide the acquisition window for limiting sample data. At 166, the physical location of each of the wideband spectrum-sensing units 110 is stored in a first memory 124. In various embodiments, 162, 164 and 166 are performed in parallel or in any sequential combination.

At 170, the slave transceiver 102 transmits a transmission, and at 172 and 174, the master transceiver 106 and each of the wideband spectrum-sensing units 110 respectively receive the transmission. At 176, the master transceiver 106 decodes the transmission to determine the channel number, channel start time and channel stop time (e.g., to define the acquisition window). In one embodiment at 176, the received transmission is also decoded to determine if the transmission is organized as a BLE packet, a CTE, or other WPAN protocol. At 180 and 182, the master transceiver 106 transmits and each of the wideband spectrum-sensing units 110 respectively receives the channel number and acquisition window (or channel start and channel stop time) decoded at 176. At 184, the transmission samples limited by the channel and acquisition window from the pre-processing circuits 144 are stored in a memory 124. At 186, the newly sampled transmission is correlated with the reconstructed samples to form a power delay profile for each of the wideband spectrum-sensing units 110. At 188, a location of the slave transceiver 102 is determined by applying the TDOA method to power delay profiles from the respective wideband spectrum-sensing units 110.

As will be appreciated, embodiments as disclosed include at least the following. In one embodiment, a system for localizing a wireless node comprises a master transceiver configured to receive a transmission from a slave transceiver. A plurality of wideband spectrum-sensing units are connected to a physical infrastructure, wherein a sensing location of each respective wideband spectrum-sensing unit is stored in a first memory, and a plurality of respective wideband samples of the transmission sampled by each of the wideband spectrum-sensing units is stored in a respective second memory, wherein each of the respective wideband samples are limited by an acquisition window received by each of the wideband spectrum-sensing units from the master transceiver. A respective time reference of each of the wideband spectrum-sensing units and the master transceiver are synchronized to a reference clock. A processor is connected to the master transceiver and each of the wideband spectrum-sensing units. The processor is configured to determine a slave location of the slave transceiver wherein for each of the wideband spectrum-sensing units, the wideband samples from the respective second memory are correlated with a corresponding plurality of reconstructed samples stored in the first memory, to determine a respective power delay profile of the transmission, and the slave location of the slave transceiver is determined relative to the respective sensing locations of the wideband spectrum-sensing units by applying a Time Difference Of Arrival method to the respective power delay profiles.

Alternative embodiments of the system for localizing a wireless node include one of the following features, or any combination thereof. Each of the wideband spectrum-sensing units comprise an Analog to Digital Converter (ADC) configured to sample the transmission to generate the plurality of wideband samples, wherein the ADC has an ADC bandwidth greater than a receive bandwidth of the master transceiver. The ADC includes a Radio Frequency Front End amplifier having a fixed gain. The ADC includes an oversampling circuit for sampling the transmission, wherein the ADC bandwidth is greater than, or equal to, ten times the receive bandwidth. A signal pre-processing circuit is configured to limit an output of the ADC to the acquisition window and the frequency range corresponding to the channel number, to form the plurality of wideband samples. The reconstructed samples are determined from a previous transmission received by each of the wideband spectrum-sensing units. Each of the respective wideband samples are further limited by a frequency range corresponding to a channel number. The master transceiver and the slave transceiver each transceive with a Wireless Personal Area Network protocol. The physical infrastructure is an automobile and the slave transceiver is a key Frequency Operated Button.

In another embodiment, a method for localizing a wireless node comprises synchronizing a respective time reference of a plurality of wideband spectrum-sensing units and a master transceiver, and storing a sensing location of each of the respective wideband spectrum-sensing units in a first memory. The master transceiver and each of the wideband spectrum-sensing units receive a transmission from a slave transceiver. The master transceiver decodes a channel number, a channel start time and a channel end time from the transmission. Each of the wideband spectrum-sensing units receive from the master transceiver, the channel number, the channel start time and the channel end time of the transmission, wherein an acquisition window begins at the channel start time and ends at the channel end time. A plurality of respective wideband samples of the transmission received by each of the wideband spectrum-sensing units during the acquisition window are stored in a respective second memory, wherein each of the respective wideband samples are limited by a frequency range corresponding to the channel number. For each of the wideband spectrum-sensing units, the wideband samples from the respective second memory are correlated with a corresponding plurality of reconstructed samples stored in the first memory to form a respective power delay profile of the transmission. A slave location of the slave transceiver relative to the respective sensing locations of the wideband spectrum-sensing units is determined by applying a Time Difference Of Arrival method to the respective power delay profiles.

Alternative embodiments of the method for localizing a wireless node include one of the following features, or any combination thereof. The transmission is sampled with an Analog to Digital Converter to generate the plurality of wideband samples. A low power state of the wideband spectrum-sensing units is exited in response to the master transceiver receiving the transmission and communicating an activity status from the master transceiver to each of the wideband spectrum-sensing units. The reconstructed samples are determined from a previous transmission received by each of the wideband spectrum-sensing units. Each power delay profile includes a plurality of signals having a respective magnitude and multipath time delay, each signal corresponding to a respective path between the slave transceiver and the respective wideband spectrum-sensing unit. A direct path between the slave transceiver and the respective wideband spectrum-sensing unit is determined from the respective path with the shortest multipath time delay. An object location of an intervening object between the slave transceiver and the respective wideband spectrum-sensing unit is determined from at least one indirect path of the power delay profile. A physical environment is mapped from a plurality of object locations of respective intervening objects between the slave transceiver and the respective wideband spectrum-sensing unit, wherein the object locations are determined by one or more indirect paths of the power delay profile.

In another embodiment, a method for localizing a wireless node comprises receiving by each of a plurality of wideband spectrum-sensing units, from a master transceiver, a channel start time and a channel end time of a transmission from a slave transceiver received by the master transceiver, wherein a sensing location of each of the wideband spectrum-sensing units is stored in a first memory, and each of the wideband spectrum-sensing units and the master transceiver is synchronized to a time reference. A plurality of respective wideband samples of the transmission received by each of the wideband spectrum-sensing units starting at the channel start time and ending at the channel end time is stored in a respective second memory, each of the respective wideband samples are generated by an Analog to Digital Converter. For each of the wideband spectrum-sensing units, the wideband samples from the respective second memory are correlated with a corresponding plurality of reconstructed samples stored in the first memory to form a respective power delay profile of the transmission. A slave location of the slave transceiver relative to the respective physical locations of the wideband spectrum-sensing units is determined by applying a Time Difference Of Arrival method to the respective power delay profiles.

Alternative embodiments of the method for localizing a wireless node include one of the following features, or any combination thereof. The master transceiver and the slave transceiver each transceive with a Wireless Personal Area Network protocol. The master transceiver has a narrow bandwidth being less than a respective bandwidth of each of the wideband spectrum-sending units.

Although the invention is described herein with reference to specific embodiments, various modifications and changes can be made without departing from the scope of the present invention as set forth in the claims below. Accordingly, the specification and figures are to be regarded in an illustrative rather than a restrictive sense, and all such modifications are intended to be included within the scope of the present invention. Any benefits, advantages, or solutions to problems that are described herein with regard to specific embodiments are not intended to be construed as a critical, required, or essential feature or element of any or all the claims.

Unless stated otherwise, terms such as "first" and "second" are used to arbitrarily distinguish between the elements such terms describe. Thus, these terms are not necessarily intended to indicate temporal or other prioritization of such elements.

What is claimed is:

1. A system for localizing a wireless node comprising:
a master transceiver configured to receive a transmission from a slave transceiver;
a plurality of wideband spectrum-sensing units connected to a physical infrastructure, wherein a sensing location of each respective wideband spectrum-sensing unit is stored in a first memory, and a plurality of respective wideband samples of the transmission sampled by each of the wideband spectrum-sensing units is stored in a respective second memory, wherein each of the respective wideband samples are limited by an acquisition window, received by each of the wideband spectrum-sensing units from the master transceiver;
a respective time reference of each of the wideband spectrum-sensing units and the master transceiver synchronized to a reference clock; and
a processor connected to the master transceiver and each of the wideband spectrum-sensing units, the processor configured to determine a slave location of the slave transceiver wherein:
for each of the wideband spectrum-sensing units, the wideband samples from the respective second memory are correlated with a corresponding plurality of reconstructed samples stored in the first memory, to determine a respective power delay profile of the transmission, and
the slave location of the slave transceiver is determined relative to the respective sensing locations of the wideband spectrum-sensing units by applying a Time Difference Of Arrival method to the respective power delay profiles.

2. The system of claim 1 wherein each of the wideband spectrum-sensing units comprise an Analog to Digital Converter (ADC) configured to sample the transmission to generate the plurality of wideband samples, wherein the ADC has an ADC bandwidth greater than a receive bandwidth of the master transceiver.

3. The system of claim 2 wherein the ADC includes a Radio Frequency Front End amplifier having a fixed gain.

4. The system of claim 2 wherein the ADC includes an over-sampling circuit for sampling the transmission, wherein the ADC bandwidth is greater than, or equal to, ten times the receive bandwidth.

5. The system of claim 2 further comprising a signal pre-processing circuit configured to limit an output of the ADC to the acquisition window and the frequency range corresponding to the channel number, to form the plurality of wideband samples.

6. The system of claim 1 wherein the reconstructed samples are determined from a previous transmission received by each of the wideband spectrum-sensing units.

7. The system of claim 1 wherein each of the respective wideband samples are further limited by a frequency range corresponding to a channel number.

8. The system of claim 1 wherein the master transceiver and the slave transceiver each transceive with a Wireless Personal Area Network protocol.

9. The system of claim 1 wherein the physical infrastructure is an automobile and the slave transceiver is a key Frequency Operated Button.

10. A method for localizing a wireless node comprising:
synchronizing a respective time reference of a plurality of wideband spectrum-sensing units and a master transceiver, and storing a sensing location of each of the respective wideband spectrum-sensing units in a first memory;
receiving by the master transceiver and each of the wideband spectrum-sensing units, a transmission from a slave transceiver;
decoding by the master transceiver, a channel number, a channel start time and a channel end time from the transmission;
receiving by each of the wideband spectrum-sensing units, from the master transceiver, the channel number, the channel start time and the channel end time of the transmission, wherein an acquisition window begins at the channel start time and ends at the channel end time;
storing in a respective second memory, a plurality of respective wideband samples of the transmission received by each of the wideband spectrum-sensing units during the acquisition window, wherein each of the respective wideband samples are limited by a frequency range corresponding to the channel number;
for each of the wideband spectrum-sensing units, correlating the wideband samples from the respective second memory with a corresponding plurality of reconstructed samples stored in the first memory to form a respective power delay profile of the transmission; and
determining a slave location of the slave transceiver relative to the respective sensing locations of the wideband spectrum-sensing units by applying a Time Difference Of Arrival method to the respective power delay profiles.

11. The method of claim 10 further comprising sampling the transmission with an Analog to Digital Converter to generate the plurality of wideband samples.

12. The method of claim 10 further comprising exiting a low power state of the wideband spectrum-sensing units in response to the master transceiver receiving the transmission and communicating an activity status from the master transceiver to each of the wideband spectrum-sensing units.

13. The method of claim 10 further comprising determining the reconstructed samples from a previous transmission received by each of the wideband spectrum-sensing units.

14. The method of claim 10 wherein each power delay profile includes a plurality of signals having a respective magnitude and multipath time delay, each signal corresponding to a respective path between the slave transceiver and the respective wideband spectrum-sensing unit.

15. The method of claim 10 further comprising determining a direct path between the slave transceiver and the respective wideband spectrum-sensing unit from the respective path with the shortest multipath time delay.

16. The method of claim 10 further comprising determining an object location of an intervening object between the slave transceiver and the respective wideband spectrum-sensing unit from at least one indirect path of the power delay profile.

17. The method of claim 10 further comprising mapping a physical environment from a plurality of object locations of respective intervening objects between the slave transceiver and the respective wideband spectrum-sensing unit, wherein the object locations are determined by one or more indirect paths of the power delay profile.

18. A method for localizing a wireless node comprising:
receiving by each of a plurality of wideband spectrum-sensing units, from a master transceiver, a channel start time and a channel end time of a transmission from a slave transceiver received by the master transceiver, wherein a sensing location of each of the wideband spectrum-sensing units is stored in a first memory, and each of the wideband spectrum-sensing units and the master transceiver is synchronized to a time reference;
storing in a respective second memory, a plurality of respective wideband samples of the transmission received by each of the wideband spectrum-sensing units starting at the channel start time and ending at the channel end time, wherein each of the respective wideband samples are generated by an Analog to Digital Converter;
for each of the wideband spectrum-sensing units, correlating the wideband samples from the respective second memory with a corresponding plurality of reconstructed samples stored in the first memory to form a respective power delay profile of the transmission; and
determining a slave location of the slave transceiver relative to the respective physical locations of the wideband spectrum-sensing units by applying a Time Difference Of Arrival method to the respective power delay profiles.

19. The method of claim 18 wherein the master transceiver and the slave transceiver each transceive with a Wireless Personal Area Network protocol.

20. The method of claim 18 wherein the master transceiver has a narrow bandwidth being less than a respective bandwidth of each of the wideband spectrum-sending units.

* * * * *